M. J. SOBRASKE.
TUBE TESTING DEVICE.
APPLICATION FILED JUNE 5, 1915.
1,222,817.
Patented Apr. 17, 1917.
2 SHEETS—SHEET 2.
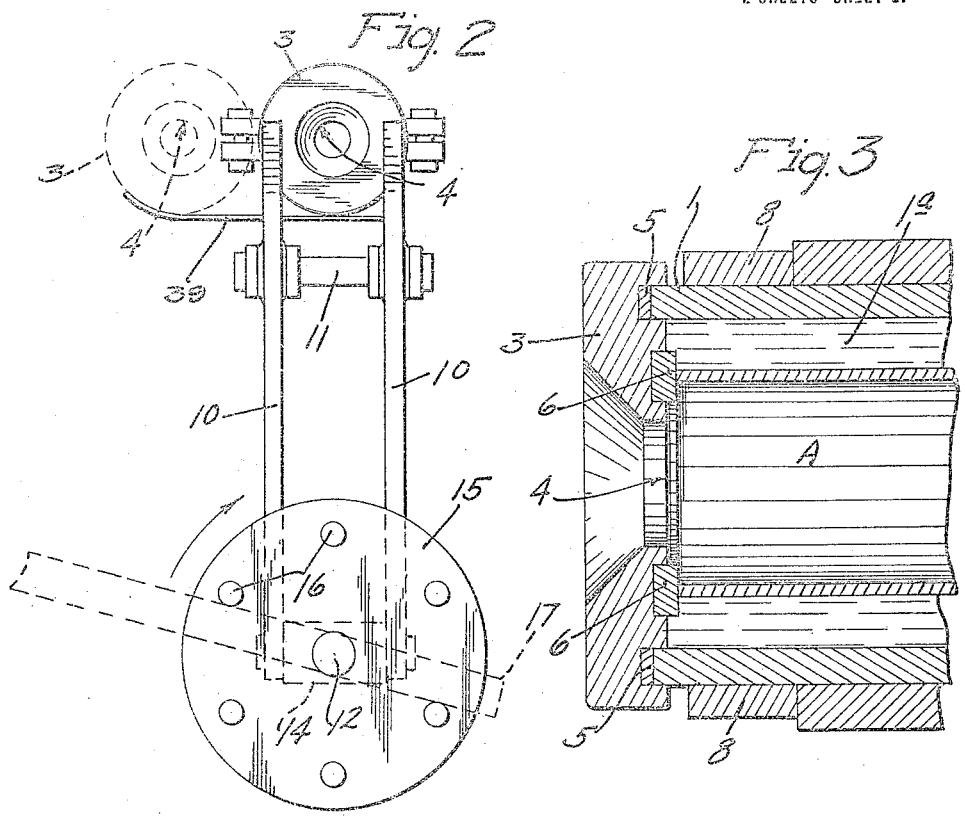
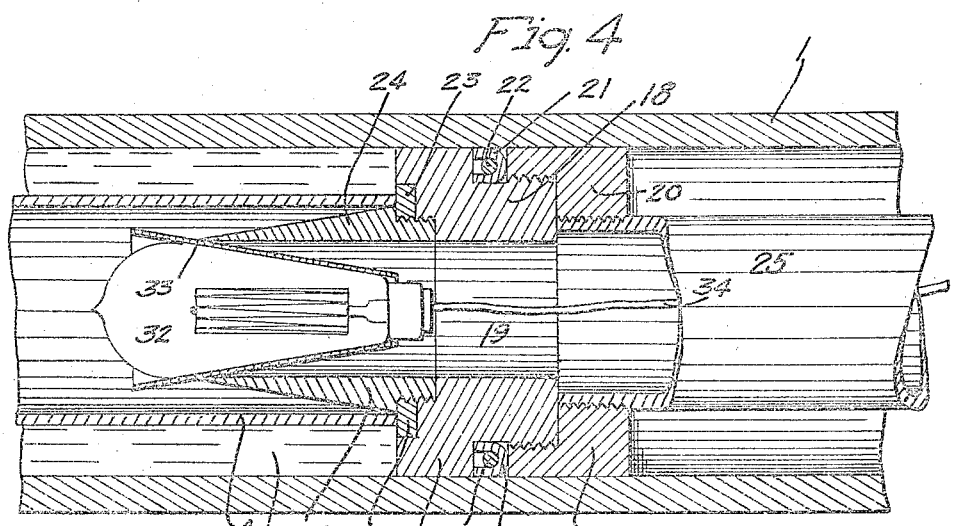
WITNESSES
E. C. Skinkle
A. H. Opsahl
INVENTOR
Martin J. Sobraske
BY HIS ATTORNEYS
Williamson Merchant

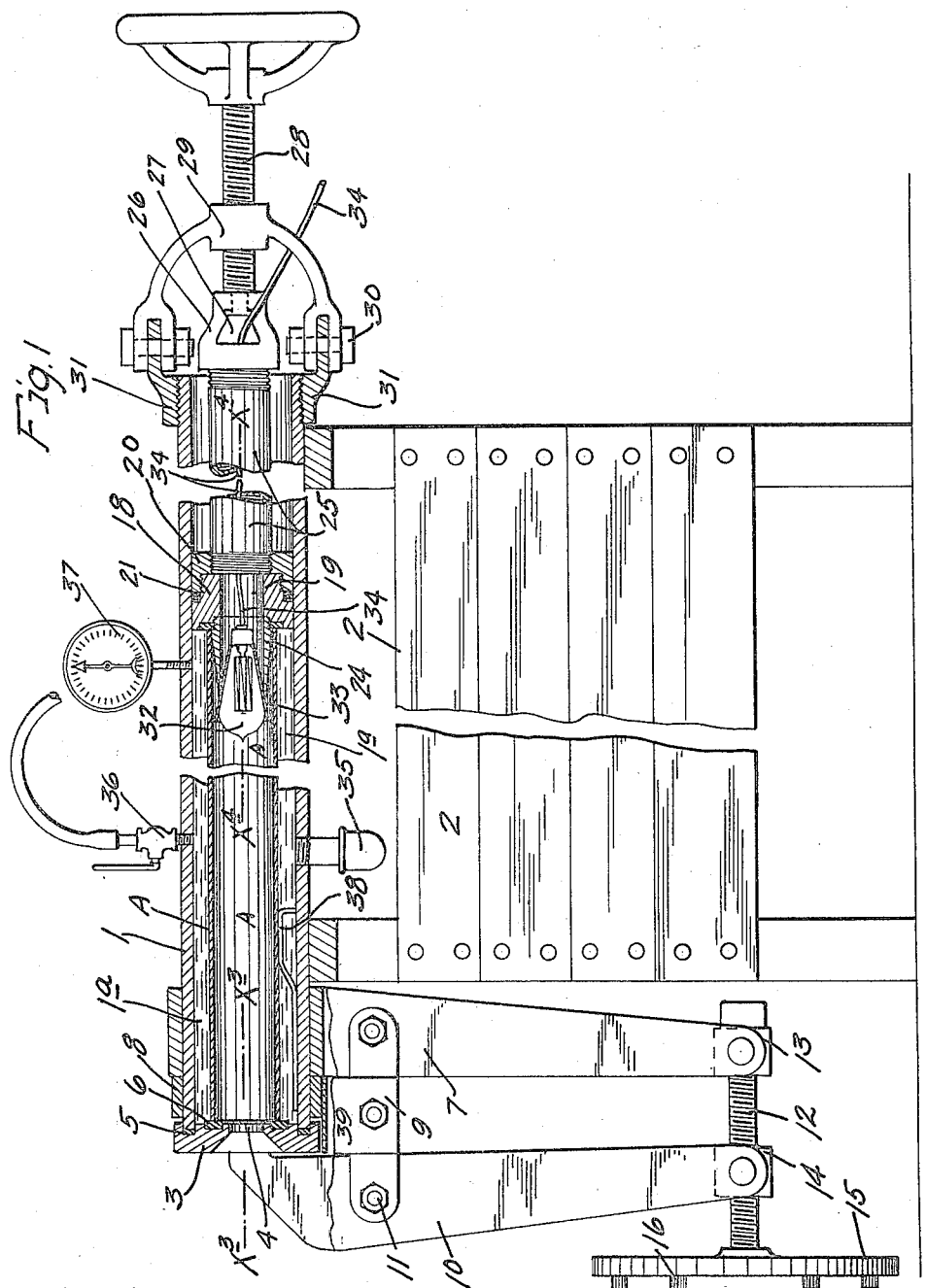

UNITED STATES PATENT OFFICE.

MARTIN J. SOBRASKE, OF MINNEAPOLIS, MINNESOTA.

TUBE-TESTING DEVICE.

1,222,817.

Specification of Letters Patent.  Patented Apr. 17, 1917.

Application filed June 5, 1915. Serial No. 32,340.

*To all whom it may concern:*

Be it known that I, MARTIN J. SOBRASKE, a citizen of the United States, residing at Minneapolis, in the county of Hennepin and State of Minnesota, have invented certain new and useful Improvements in Tube-Testing Devices, and I do hereby declare the following to be a full, clear, and exact description of the invention, such as will enable others skilled in the art to which it appertains to make and use the same.

My invention has for its object to provide an improved device especially adapted for testing the crushing or collapse resisting strength of superheater tubes of locomotives, which device, however, is capable of more general use for the purpose indicated.

Generally stated, the invention consists of the novel devices and combinations of devices hereinafter described and defined in the claims.

Superheater tubes of locomotives, as is well known, are of large diameter and are subject to very great external pressure tending to collapse or crush the same. When the superheater tube of a locomotive is collapsed or crushed, very serious accidents follow, and furthermore, they can be replaced only by considerable expense. When the ends of superheater tubes are burned out, it is customary to weld tube sections onto the ends thereof, so that they may be again used. If the welds are well formed, the tube will be as good as new, but if not, they will have weak spots likely to be crushed in when the locomotive is in service.

My invention provides an extremely simple and highly efficient testing device, by means of which the superheating tubes, either new or patched, may be put under sufficiently high external pressure to thoroughly test the same for weak spots liable to give trouble in service.

The preferred form of the improved testing device is illustrated in the accompanying drawings wherein like characters indicate like parts throughout the several views..

Referring to the drawings:

Figure 1 is a view partly in side elevation and partly in vertical section, showing my improved tube testing device, and showing the same supported by a suitable table or framework;

Fig. 2 is a front elevation of the testing device but with the table removed;

Fig. 3 is an enlarged section taken on the line $x^3$ $x^3$ on Fig. 1; and

Fig. 4 is an enlarged section taken on the line $x^4$ $x^4$ on Fig. 1.

The testing device comprises a long and very strong testing tube or outer casing 1 which is preferably a seamless steel tube having the required thick walls. This testing tube 1, as shown, is supported in a horizontal position by a suitable table or framework 2. A cap 3, which has an axial opening 4, is provided on its inner face with an annular recess in which a suitable gasket or packing 5 is inserted. This gasket 5 is adapted to be pressed against the front end of the testing tube 1 to form a liquid-tight joint therewith, when the said cap 3 is applied thereto, as shown in Fig. 1. Spaced inward from the gasket 5, but outward of the axial opening 4, the cap 3 is provided with another annular gasket 6 that is adapted to be engaged with the front end of the superheater tube A, when the latter is in position for testing, as shown in Fig. 1.

As a means for tightly clamping the cap 3 against the end of the testing tube 1, I preferably provide a clamping device shown in Figs. 1 and 2. This clamping device comprises a heavy arm 7 having a sleeve-like upper end that surrounds and is rigidly secured to the front end of the testing tube 1. As shown, adjacent to a fixed collar 8 on the said tube, a fulcrum block 9 is rigidly secured to the arm 7, and a lever 10 is intermediately pivoted to the forwardly projecting portion of the said fulcrum block. The said lever 10 is a bifurcated or twin lever made up of two laterally spaced parts pivotally connected to prongs of the said fulcrum block 9 by a bolt 11. The relatively short upper ends of the lever members 10 are arranged to press against diametrically opposite face portions of the cap 3. The numeral 12 indicates a clamping screw which, as shown, is swiveled to a block 13 on the lower end of the arm 7 and has threaded engagement with a nut block 14 pivoted to the lower ends of the lever members 10. At its front end, the clamping screw 12 is preferably provided with a disk-like head 15 having circumferentially spaced laterally projecting pins 16, to which a lever 17 indicated by dotted lines in Fig. 2, may be applied for the purpose of tightening the said screw, and hence, the lever members 10, with very great power, so as to insure a perfectly liquid-tight joint under high pressure between the front end of the testing tube 1 and the cap 3.

The testing tube 1 is preferably a cylindrical tube having a very smooth internal bore; and working therein is an adjustable piston-like head 18 having an axial passage 19. This head 18 has an annular supplemental section 20 shown as connected thereto by screw-threaded engagement, but having a marginal edge portion spaced from an annular shoulder of the said head 18 so as to afford an annular seat for a pressure-seated gasket 21, best shown in Fig. 4. This annular gasket 21 is of a pliable material, such, for example, as leather, and in cross section is U-shaped and in the channel thereof, is placed an endless metallic spreader ring 22.

The inner or rear end of the superheater tube A, the crushing strength of which is to be tested, is seated against a pliable annular gasket 23 set into the inner face of the head 18. The numeral 24 indicates a tube centering sleeve having a large axial passage, a conical external surface and threaded shank, which latter is screwed into a threaded seat in the head 18. The axial passages of the head 18 and centering sleeve 24 are alined.

The supplemental annular section 20 of the head 18 is internally threaded and engaged by the threaded end of a spacing tube 25, the outer end of which spacing tube is preferably threaded and screwed into a cap 26. This cap 26 has a passage 27 extending from one side to the axis thereof. The cap 26 is preferably swiveled to the inner end of a clamping screw 28, which latter works with threaded engagement through the hub of a yoke 29, which latter is pivotally connected at 30 to diametrically opposite lugs of an anchoring collar 31, which latter is screw-threaded onto the rear end of the testing tube 1.

The numeral 32 indicates an electric lamp, preferably contained within a conical reflector 33 that is nearly or quite inset into the conical tube centering sleeve 24. The supply wires 34 which lead to and from the lamp 32 are extended through the axial opening of the head 18, through the spacing tube 25 and through the opening 27 of the cap 26.

The numeral 35 indicates a water or oil supply pipe which will lead from a hydraulic press, not shown, and which opens into the testing tube 1. The numeral 36 indicates a valve-equipped air discharge pipe, the valve of which will, of course, be closed after the air has been forced from the said testing tube. The numeral 37 indicates a pressure gage connected to the interior of the said testing tube. The numeral 38 indicates a spacing device preferably in the form of a thin flat sheet of metal bent so that it has a raised portion adapted to engage the bottom of the superheating tube and hold the outer end portion thereof alined with the gasket 6 when the said superheater tube is placed within the testing tube. Obviously, the conical centering sleeve 24 properly centers the superheater tube. When the superheater tube is applied, as shown, in the drawings, it is concentric with the testing tube.

In applying the superheater tube for testing purposes, it will be inserted into the testing tube while the cap 3 is removed therefrom; and to facilitate movements of the head 3, (which is quite heavy), to and from working position, a shelf or runway 39 is shown as secured to the fulcrum block 9. The superheater tube A will be inserted into the testing tube while the adjustable or traveling head 18 is forced nearly, but not quite far enough forward to hold the said tube in final position and the inner end of the said tube will be telescoped onto the centering cone or sleeve 24, and hence, alined with the gasket 23 of the head 18. Then the cap 3 will be applied and rigidly secured by means of the clamping device described; and after this has been done, by adjustments of the clamping screw 28, the head 18 will be forced forward and its gasket 23 very tightly pressed against the inner end of the flue A. This same act of pressing the gasket 23 against the inner end of the flue A, forces the outer end of the said flue against the inner gasket 6 of the head 3, so that the interior of the said superheater flue will be cut off from the surrounding pressure chamber 1ª which is formed within the testing tube between the cap or head 3 and the piston-like head 18. At the same time, the interior of the said superheater flue will be subject only to atmospheric pressure and the interior thereof may be seen through the axial opening of the cap 3 when the electric lamp 32 is lighted. The said lamp is provided so that the inner surface of the flue may be seen from the exterior of the testing apparatus and, consequently, any flaws or leakage therein be observed by the person making the test.

Obviously, by the use of the proper hydraulic pump, water or oil may be forced into the said pressure chamber 1ª under any desired high pressure, and in this way the crushing or collapse resisting strength of the tube under test may be determined.

If the tube is found to have flaws, it will not, of course, be applied in the boiler, at least until it has been again repaired and again tested.

For testing superheater flues of different lengths, I provide so-called spacing pipes or tubes 25, also of different length, it being obvious that the longer the superheating tube, the shorter will be the spacing tube required. As already noted, the said spacing tube 25 is readily detachable from the supplemental head section 20 and from the clamping cap 26.

The yoke 29 is of such shape and is hinged so that it may be turned entirely to one side of the testing tube, when the clamping screw 28 is released; and this permits not only the spacing tube 25 but also the head 18—20 and its centering sleeve 24 to be removed or applied through the rear end of the said testing tube.

This tube testing device has been put into actual use and found highly efficient for the purposes had in view, while especially designed for the testing of superheating tubes, it may, of course, be used for testing the crushing or collapse resisting strength of various other tubular bodies.

What I claim is:

1. A device for testing the crushing strength of tubes, comprising a testing tube having a conduit for delivering fluid thereto under pressure, and provided with a cap at one end and a head working within the other end portion thereof, coöperating to tightly clamp the ends of a tube being tested and hold the same within the said testing tube, subject to the surrounding fluid pressure.

2. In a device for testing the crushing strength of tubes, the combination with a testing tube, of a cap detachably secured to one end of said testing tube, and a head working adjustably within the other end portion of said testing tube, the said cap and head having gaskets adapted to engage the ends of the tube to be tested and hold the same within said testing tube subject to the surrounding fluid pressure.

3. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, and a pressure device applied to said tube and operating on the said piston-like head to force the same toward said cap.

4. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, said piston-like head having a tube centering sleeve and an axial passage alined therewith.

5. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, the said cap having an axial passage permitting inspection of the interior of the tube to be tested.

6. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, the said cap having an axial passage permitting inspection of the interior of the tube to be tested, and a lamp supported from said piston-like head in position to be located within the tube to be tested.

7. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, said piston-like head having an axial passage and a tube centering sleeve alined therewith, an electric lamp supported within said centering sleeve and having electric connections extended outward through the said head, the said cap having an axial passage permitting inspection of the interior of the tube being tested.

8. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, a clamping screw working in a part anchored to said testing tube, and a detachable spacing tube interposed between said clamping screw and said piston-like head.

9. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, a clamping screw working in a part anchored to said testing tube, a detachable spacing tube interposed between said clamping screw and said piston-like head, the said head having an axial passage alined with said spacing tube, an electric lamp supported from said head and having electric connections extended outward through said head and through said spacing tube, the said cap having an axial passage permitting inspection of the interior of the tube to be tested.

10. In a device for testing the crushing strength of tubes, the combination with a testing tube, of a cap detachably secured to one end of said testing tube, a piston-like head working within the other end portion of said testing tube, said cap and head having gaskets adapted to engage the ends of a tube to be tested, a yoke hinged to the end of said tube, a clamping screw working through said yoke and a spacing device interposed between said screw and said piston-like head.

In testimony whereof I affix my signature in presence of two witnesses.

MARTIN J. SOBRASKE.

Witnesses:
B. G. WHEELER,
F. D. MERCHANT.

Copies of this patent may be obtained for five cents each, by addressing the "Commissioner of Patents, Washington, D. C."